(12) United States Patent
Hardy et al.

(10) Patent No.: US 9,544,196 B2
(45) Date of Patent: Jan. 10, 2017

(54) METHODS, SYSTEMS AND COMPUTER PROGRAM PRODUCTS FOR DETERMINING INSTALLATION STATUS OF SMS PACKAGES

(75) Inventors: Michael Hardy, Lawrenceville, GA (US); James N. Entrekin, Canton, GA (US); Richard Anthony Glenn, Cumming, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 2177 days.

(21) Appl. No.: 11/524,105

(22) Filed: Sep. 20, 2006

(65) Prior Publication Data

US 2008/0071885 A1 Mar. 20, 2008

(51) Int. Cl.
G06F 15/16 (2006.01)
H04L 12/24 (2006.01)

(52) U.S. Cl.
CPC .................... *H04L 41/22* (2013.01)

(58) Field of Classification Search
USPC ........................................................ 709/219
See application file for complete search history.

(56) References Cited

U.S. PATENT DOCUMENTS

| | | | | |
|---|---|---|---|---|
| 5,867,713 | A * | 2/1999 | Shrader et al. | 717/176 |
| 6,158,025 | A * | 12/2000 | Brisse et al. | 714/48 |
| 6,618,771 | B1 * | 9/2003 | Leja et al. | 710/8 |
| 7,703,091 | B1 * | 4/2010 | Martin et al. | 717/174 |
| 2002/0099806 | A1 * | 7/2002 | Balsamo et al. | 709/223 |
| 2003/0023674 | A1 * | 1/2003 | Hildebrand | 709/203 |
| 2003/0212899 | A1 * | 11/2003 | Curtis | 713/200 |
| 2004/0054650 | A1 * | 3/2004 | Chun | 707/1 |
| 2004/0194082 | A1 * | 9/2004 | Purkeypile et al. | 717/174 |
| 2004/0199514 | A1 * | 10/2004 | Rosenblatt et al. | 707/10 |
| 2004/0203963 | A1 * | 10/2004 | Shivaram et al. | 455/466 |
| 2006/0080656 | A1 * | 4/2006 | Cain et al. | 717/174 |
| 2006/0122976 | A1 * | 6/2006 | Baluja et al. | 707/3 |
| 2006/0159090 | A1 * | 7/2006 | Chang et al. | 370/390 |
| 2006/0248447 | A1 * | 11/2006 | Makkonen | 715/513 |
| 2007/0082737 | A1 * | 4/2007 | Morrow et al. | 463/42 |
| 2007/0105628 | A1 * | 5/2007 | Arbogast et al. | 463/42 |

(Continued)

OTHER PUBLICATIONS

"Microsoft Systems Management Server", Wikipedia, http://en.wikipedia.org/wiki/System_Management_Server, 2005, 1 page.

(Continued)

*Primary Examiner* — Richard G Keehn
(74) *Attorney, Agent, or Firm* — Myers Bigel, P.A.

(57) ABSTRACT

Methods of determining status of advertised system management server (SMS) packages at a client device include receiving a request for a determination of the status from a user at the client device. Responsive to the received request and without further input from the user a plurality of SMS packages that have been advertised to the client device may be identified, an installation status of the identified plurality of SMS packages may be determined and a graphical user interface (GUI) may be generated. The GUI lists the identified plurality of SMS packages and provides a visual indication of the determined installation status of the listed plurality of SMS packages. The generated GUI may be displayed to the user on a display of the client device.

14 Claims, 7 Drawing Sheets

(56) References Cited

U.S. PATENT DOCUMENTS

2007/0218998 A1\* 9/2007 Arbogast et al. ............... 463/42
2009/0082099 A1\* 3/2009 Luciano et al. ............... 463/26

OTHER PUBLICATIONS

"System Management Server 2003 SP1 Product Overview", http://www.microsoft.com/smserver/evaluation/overview/defaul.mspx, Sep. 10, 2004, 4 pages.

SMS 2003 Cases Studies, "Aquila, Inc., Improved Asset Management and Software Distribution and Security", http://www.microsoft.com/smserver/evaluation/casestudies/casestudy.asp?CaseStudyID=1 . . . , Nov. 11, 2003, 5 pages.

"System Management Server 2003 Features", http://www.microsoft.com/smserver/evaulation/features/default.mspx, Oct. 22, 2003, 3 pages.

\* cited by examiner

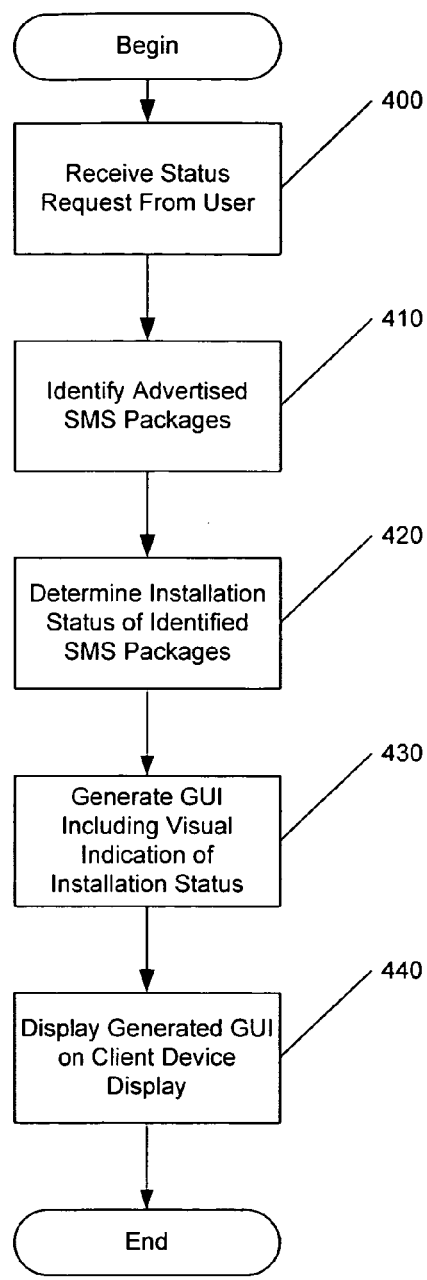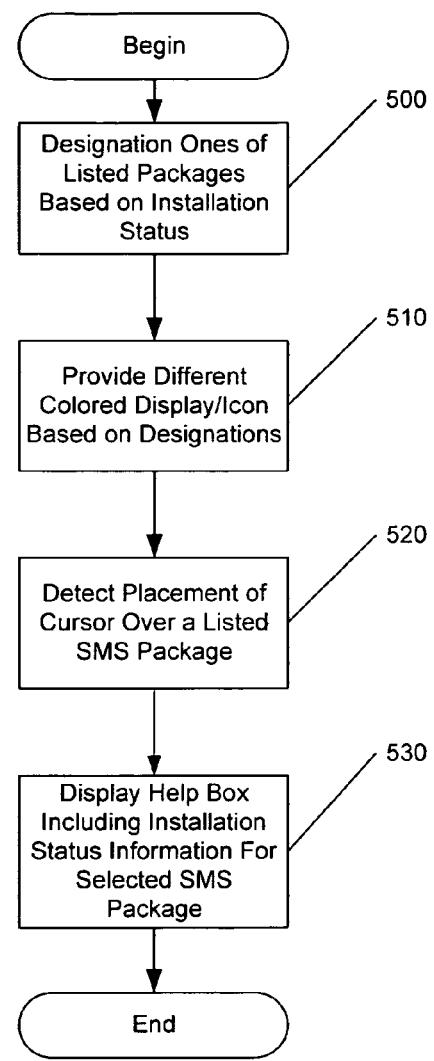
Figure 4
Figure 5

METHODS, SYSTEMS AND COMPUTER PROGRAM PRODUCTS FOR DETERMINING INSTALLATION STATUS OF SMS PACKAGES

BACKGROUND OF THE INVENTION

The present invention relates to methods, systems and computer program products for monitoring computer systems and more particularly, for monitoring applications distributed to such computer systems.

Computer networks have grown increasingly complex with the use of distributed client/server applications, mixed platforms and multiple protocols all on a single physical backbone. The control of traffic on the networks is likewise moving from centralized information technology (IT) departments to distributed workgroups. The growing utilization of computer networks is not only causing a move to new, high-speed technologies but is at the same time making the operation of computer networks more critical to day-to-day business operations.

The growth in complexity and dependence on computer networks heightens the need for network management tools to design, build and maintain computer networks. The mix of protocols and vendors of installed hardware on many computer networks generally increases the difficulty of accomplishing network management. This problem may arise in planning or designing changes to a network, monitoring performance of a network, and testing the impact on performance of different hardware and software being installed on a network.

Systems management software has been proposed to assist in management of software installed on a managed computer network, which may allow an organization to control distribution of applications, updates to applications, security patches and the like across network devices supported by the organization from a centralized server location. For example, the system management server (SMS), available from Microsoft Corporation, is a software product for managing large groups of Windows-based computer systems including supporting distribution of software to supported devices by advertising available SMS packages to designated client devices and delivery of advertised SMS packages to client devices for installation.

SMS provides remote control, patch management, software distribution and hardware and software inventory functionality. SMS provides such functionality in a mobile environment through use of industry standards independent of connection or location, which may be advantageous for organizations supporting laptop computers and the like.

In particular, SMS provides for both deployment and monitoring of deployed security patches and the like from a central location to assist IT managers with assuring proper installation of advertised SMS packages. In addition, it is possible to obtain a report on advertised SMS packages at a client device having an SMS client application executing thereon. An example of such a report is seen in the graphical user interface (GUI) shown in FIG. 1. However, obtaining a report such as seen in FIG. 1 using SMS generally requires a sequence of user inputs and provides a display format that may be confusing to a typical user of a client device. As a result, in a typical implementation of SMS, the SMS client application is run in the background and a user of the client device may not even be aware that the SMS client application is executing on the client device, nonetheless how to obtain status information from the SMS client application.

SUMMARY OF THE INVENTION

In some embodiments of the present invention, methods for determining status of advertised system management server (SMS) packages at a client device include receiving a request for a determination of the status from a user at the client device. Responsive to the received request and without further input from the user, the following are performed: identifying a plurality of SMS packages that have been advertised to the client device; determining an installation status of the identified plurality of SMS packages; generating a graphical user interface (GUI) that lists the identified plurality of SMS packages and provides a visual indication of the determined installation status of the listed plurality of SMS packages; and displaying the generated GUI to the user on a display of the client device.

In other embodiments, identifying the plurality of SMS packages includes identifying a plurality of SMS packages that have been advertised to the client device that are automatic and the identified plurality of SMS packages are all automatic advertised SMS packages. Receiving the request may include receiving the request at an interface application executing on the client device separately from an SMS client application executing on the client device and identifying the plurality of SMS packages and determining the installation status of the identified plurality of SMS packages may include querying, by the interface application, of log files generated by the SMS client application.

In further embodiments, generating the graphical user interface (GUI) that lists the identified plurality of SMS packages and provides a visual indication of the determined installation status of the listed plurality of SMS packages includes designating ones of the listed plurality of SMS packages as successfully installed, not installed or failed installation. Different colored displays and/or different associated icons are provided for respective ones of the listed SMS packages based on their associated designations.

In other embodiments, a green display and/or smiley face icon are associated with a successfully installed SMS package, a yellow display and/or geometric icon are associated with a not installed SMS package and a red display and/or sad face icon are associated with a failed installation SMS package. Providing different colored displays may include providing different colored backgrounds for rows of the GUI associated with respective ones of the listed plurality of SMS packages. Providing different colored backgrounds may include providing a green background for a successfully installed SMS package, a yellow background for a not installed SMS package and a red background for a failed installation SMS package.

In yet other embodiments, displaying the GUI is followed by detecting placement of a cursor of the client device over a selected one of the listed plurality of SMS packages and displaying a help box containing information associated with the selected one of the listed plurality of SMS packages on the display. The information contained in the help box may include a textual description of the determined installation status of the selected one of the listed plurality of SMS packages. The identified plurality of SMS packages may be security patches and/or software distributions advertised by an SMS server communicatively coupled to the client device.

In further embodiments, methods for determining status of advertised system management server (SMS) packages at a client device include receiving a request for a determination of the status from a user at an interface application executing on the client device separately from an SMS client application executing on the client device. The following, carried out by the interface application, are performed responsive to the received request: identifying a plurality of SMS packages that have been advertised to the client device and determining an installation status of the identified plurality of SMS packages by querying log files generated by the SMS client application and; generating a graphical user interface (GUI) that lists the identified plurality of SMS packages and provides a visual indication of the determined installation status of the listed plurality of SMS packages.

Generating the graphical user interface (GUI) that lists the identified plurality of SMS packages and provides a visual indication of the determined installation status of the listed plurality of SMS packages may include designating ones of the listed plurality of SMS packages as successfully installed, not installed or failed installation. Different colored displays and/or different associated icons may be provided for respective ones of the listed SMS packages based on their associated designations.

In yet further embodiments, methods for monitoring status of distribution of advertised system management server (SMS) packages to a plurality of client devices includes advertising the SMS packages to the client devices. Users of the client devices are requested to execute an interface application on the respective client devices, separately from SMS client applications executing on the client devices, to identifying the SMS packages that have been advertised to the client devices, determine an installation status of the identified SMS packages by querying log files generated by the SMS client applications and generate graphical user interfaces (GUIs) that list the respective identified SMS packages and provide a visual indication of the determined installation status of the listed SMS packages. Error reports are received from the users identifying problems indicated in the respective GUIs. The SMS packages may be advertised to the client devices as automatic and the identified SMS packages may all be automatic advertised SMS packages in some embodiments and errors in manual advertised packages may not be reported.

Other systems, methods, and/or computer program products according to embodiments will be or become apparent to one with skill in the art upon review of the following drawings and detailed description. It is intended that all such additional systems, methods, and/or computer program products be included within this description, be within the scope of the present invention, and be protected by the accompanying claims.

BRIEF DESCRIPTION OF THE DRAWINGS

FIGS. 4 to 6 are flowcharts illustrating operations for determining status of advertised SMS packages according to some embodiments of the present invention;

DETAILED DESCRIPTION OF EXEMPLARY EMBODIMENTS

Figure 1:
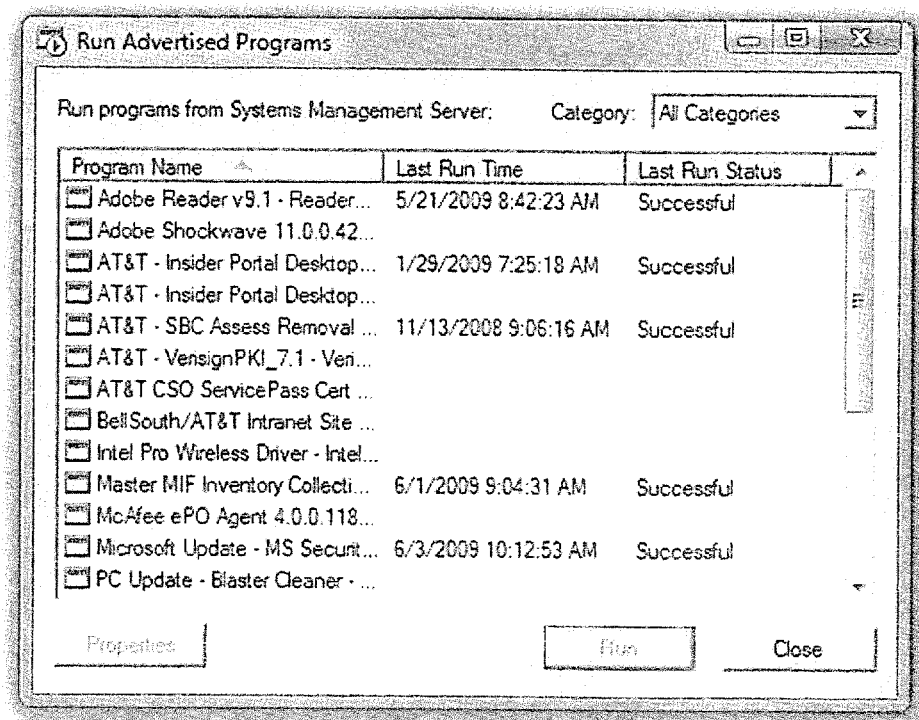
FIG. 1 is GUI illustrating package information that may be generated by a prior art SMS application.

Specific exemplary embodiments of the invention now will be described with reference to the accompanying drawings. This invention may, however, be embodied in many different forms and should not be construed as limited to the embodiments set forth herein; rather, these embodiments are provided so that this disclosure will be thorough and complete, and will fully convey the scope of the invention to those skilled in the art. The terminology used in the detailed description of the particular exemplary embodiments illustrated in the accompanying drawings is not intended to be limiting of the invention. In the drawings, like numbers refer to like elements.

As used herein, the singular forms "a", "an" and "the" are intended to include the plural forms as well, unless expressly stated otherwise. It will be further understood that the terms "includes," "comprises," "including" and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations of one or more of the associated listed items.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present specification and will not be interpreted in an idealized or overly formal sense unless expressly so defined herein.

Figure 2:
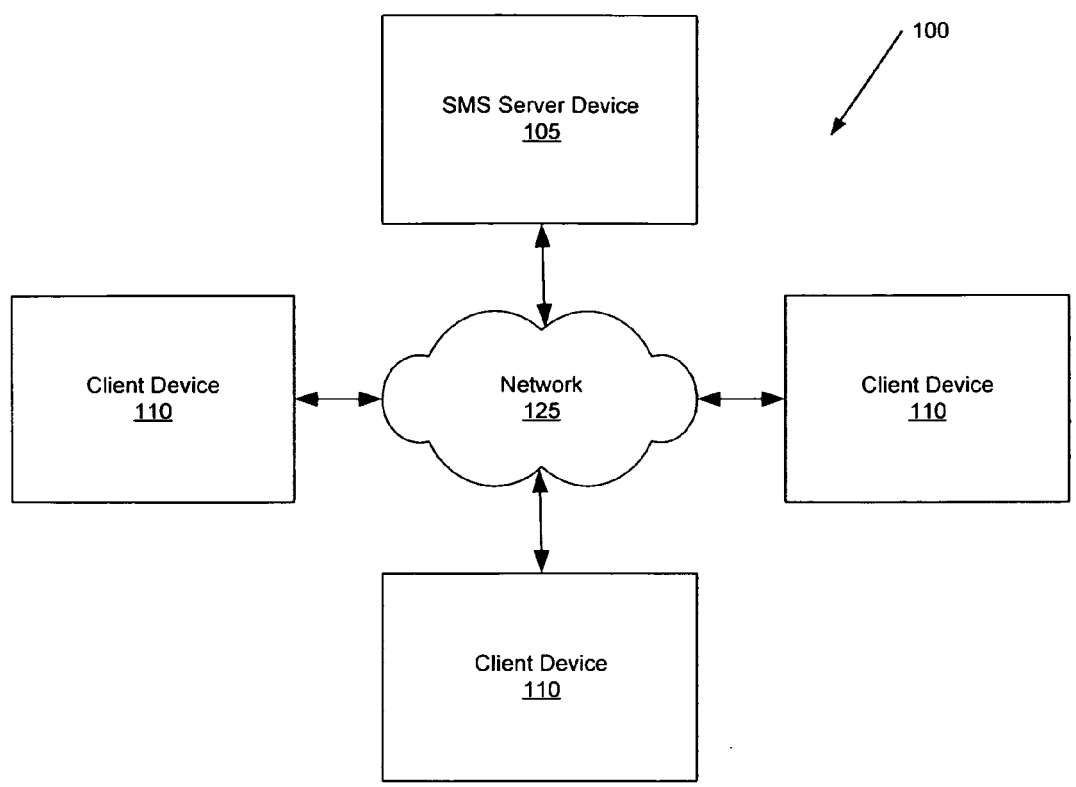
FIG. 2 is a block diagram of a hardware and software environment in which the present invention may operate according to some embodiments of the present invention.

Embodiments of the present invention will now be described below with respect to FIGS. 2 through 9. Referring first to FIG. 2, a hardware and software environment in which the present invention may operate according to some embodiments is illustrated. As shown in the embodiments of FIG. 2, the environment 100 includes a system management server (SMS) server device 105 coupled to a plurality of client devices 110 over a network 125. As will be understood by those having skill in the art, the network 125 may include a plurality of separate linked physical communication networks, which, using a protocol such as the Internet protocol (IP), may appear to be a single seamless communications network to user application programs. It is further to be understood that, while for illustration purposes in FIG. 2, the network 125 is shown as a single network, it may be comprised of a plurality of separate interconnected physical networks.

The network 125 may be used by an organization to control the distribution of security patches, applications and the like from a centralized location, such as the SMS server device 105, to a plurality of manage client devices 110, each of which may be executing an SMS client application that communicates with an SMS server application executing on the SMS server device 105. Some embodiments of the present invention, as will be described further herein, provide a quick reference tool for users of the client devices 110 to determine patching and software distribution status for their client devices 110. The users may, for example, launch the tool each morning to see if their client device 110 is up to date on security patches and any advertised software distributions. In some embodiments of the present invention, such a tool may provide advantages over native SMS tools available from Microsoft corporation, allowing easier access to the information for users and reducing the difficulty for users in understanding such information and knowing if any action is required as a result of viewing the information. Such tools may ease end user use and understanding and reduce or eliminate training otherwise required for users of the client devices 110. Such tools may be particularly beneficial in corporate environments or the like where procedures place responsibility on users of the client devices 110 for maintaining and reporting on status and patch functionality of the user devices to facilitate improved control over the configuration and update status of all such control devices. An example of such an environment is a utility or telecom corporation, where a large number of field technicians may be utilizing hardened lap-top devices and where a central IT department may wish to control application distribution and security patches across such mobile devices spread over a large geographic area and in use by technicians or the like maintaining a utility structure.

Figure 3:
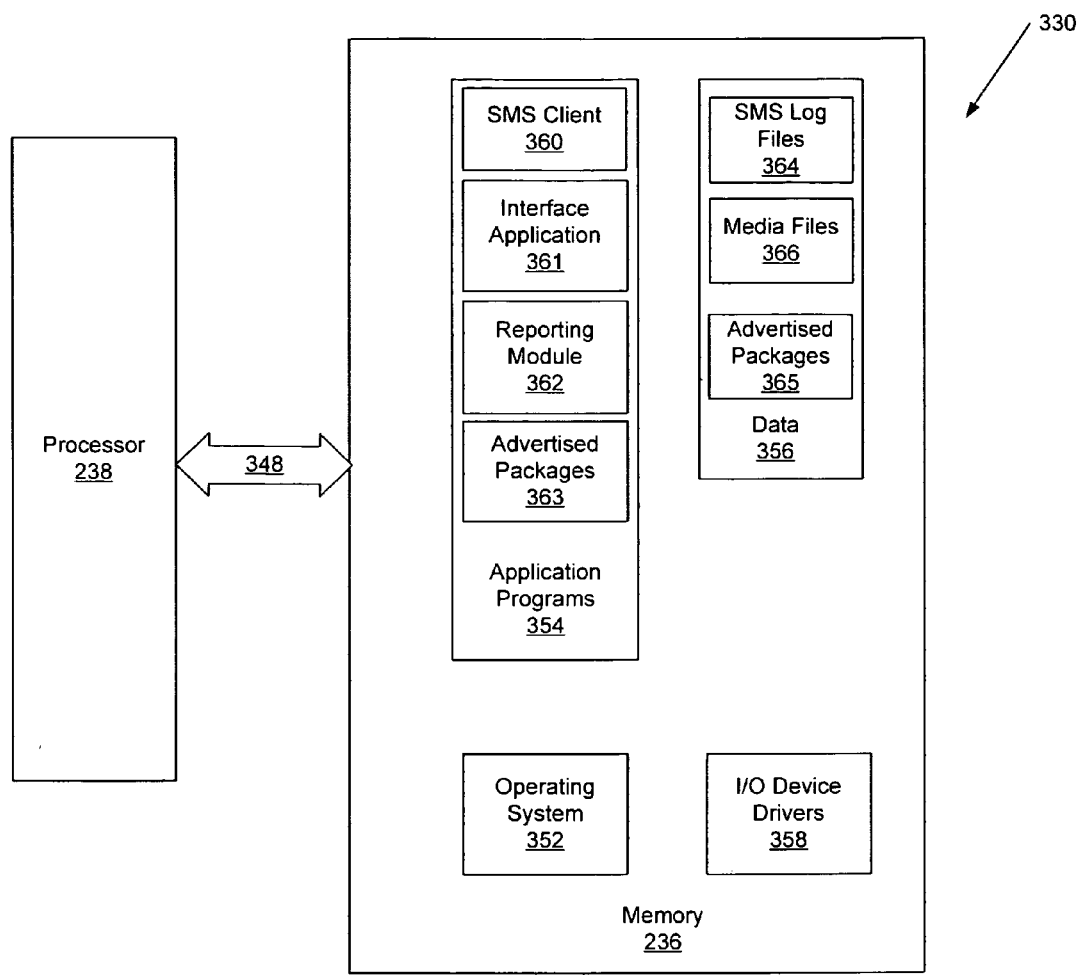
FIG. 3 is a block diagram of a data processing system according to some embodiments of the present invention.

FIG. 3 is a block diagram of a data processing system 330 that illustrates methods, systems and computer program products for determining status of advertised SMS packages in accordance with some embodiments of the present invention. More particularly, FIG. 3 illustrates embodiments of a client device 110 that is configured to receive SMS packages that are advertised by the SMS server device 105.

As shown for the embodiments of FIG. 3, the data processing system 330 includes a processor 238 that communicates with a memory 236 via an address/data bus 348. The processor 238 can be any commercially available or custom microprocessor. The memory 236 is representative of the overall hierarchy of memory devices containing the software and data used to implement the functionality of the data processing system 330. The memory 236 can include, but is not limited to, the following types of devices: cache, ROM, PROM, EPROM, EEPROM, flash memory, SRAM, and DRAM.

As shown in FIG. 3, the memory 236 may include several categories of software and data used in the data processing system 330: the operating system 352; the application programs 354; the input/output (I/O) device drivers 358; and the data 356. As will be appreciated by those of skill in the art, the operating system 352 may be any operating system suitable for use with a data processing system, such as Solaris from Sun Microsystems, OS/2, AIX or System390 from International Business Machines Corporation, Armonk, N.Y., Windows95, Windows98, Windows NT, Windows ME, Windows XP or Windows2000 from Microsoft Corporation, Redmond, Wash., Unix or Linux. The I/O device drivers 358 typically include software routines accessed through the operating system 352 by the application programs 354 to communicate with input/output devices, such as a display, keyboard and/or the like, and certain memory 236 components. The application programs 354 are illustrative of the programs that implement the various features of the data processing system 330 and preferably include at least one application that supports operations according to embodiments of the present invention. Finally, the data 356 represents the static and dynamic data used by the application programs 354, the operating system 352, the I/O device drivers 358, and other software programs that may reside in the memory 236.

As illustrated in the embodiments of FIG. 3, the application programs 354 may include an SMS client module 360, an interface application module 361, a reporting module 362 and/or advertised package modules 363. The SMS client module 360 may include functionality, such as provided by the Microsoft corporation SMS client for receiving, downloading and installing advertised SMS packages responsive to advertising of such SMS packages by an SMS server application. As such, the SMS client module 360 may be an application executing on the client devices 110 that generates one or more log files reflecting the status and activities for advertised SMS packages of which the SMS client module 360 is aware.

In some embodiments of the present invention, the interface application module 361 executes on client device 110 separately from the SMS client application module 360. The interface application module 361 may receive a request for a determination of the status of advertised SMS packages at the client device 110 from a user. The interface application module 361 alone or in combination with the reporting-module 362 in some embodiments may be configured to identify a plurality of SMS packages advertised to the client device 110, determine installation status thereof and generate a GUI that lists the identified SMS packages and provides a visual indication of the determined installation status of the packages. The I/O device drivers 358 may be used to display the generated GUI to a user on a display of the client device 110. Further operations that may be performed by the interface application module 361 and/or reporting module 362 will be described with reference to the flow chart illustrations of FIGS. 4-7. Finally, the advertised package modules 363 schematically illustrate that a variety of advertised SMS package applications may be installed and executing on the data processing system 330 as application programs 354.

For the illustrated embodiments of FIG. 3, the data 356 includes SMS log files 364, advertised packages 365 and media files 366. The SMS log files 364 may be maintained by the SMS client application module 360 and accessed by the interface application module 361 to obtain information regarding the identity and installation status of SMS packages that have been advertised to the data processing system 330. The media files 366 may include graphic or other information used in providing a visual indication of determined status in a GUI generated by the interface application module 361 and/or reporting module 362, such as smiley face icon, sad face icon and/or the like. Finally, the advertised packages 365 may represent SMS packages that have been advertised to the data processing system 330 but not yet installed and executing as application programs 354.

The data processing system 330 has been generally described above from the perspective of a data processing system 330 operating as a client device 110 (see FIGS. 2 and 3). However, it will be understood that some embodiments of the present invention include data processing systems configured to act as the SMS server device 105. In some such embodiments, for example, the application programs 354 may include an SMS server application for advertising and distributing SMS packages to clients as well as a request module (reporting module 362) configured to request that users of the client devices 110 execute an interface application 361 on respective client devices 110 to identify the SMS packages that have been advertised to the respective client devices, determine an installation status of these identified packages and generate a GUI for viewing by a user listing the respective packages and their installation status. The reporting module 362, in such embodiments, may appear to be configured to receive error reports from users identifying problems indicated in their respective GUI's.

While the present invention is illustrated, for example, with reference to the SMS client module 360 and the other modules discussed above being application programs in FIG. 3, as will be appreciated by those of skill in the art, other configurations may also be utilized for the various modules of FIG. 3 described as application programs while still benefiting from the teachings of the present invention. For example, the SMS client module 360 may also be incorporated into the operating system 352 or other such logical division of the data processing system 330. Thus, the present invention should not be construed as limited to the configuration of FIG. 3 but is intended to encompass any configuration capable of carrying out the operations described herein.

Some embodiments of operations for determining status of advertised system management server (SMS) packages at a client device will now be described with reference to the flowchart illustrations of FIGS. 4 through 6. Referring first to the embodiments illustrated in FIG. 4, operations begin with receipt of a request for a determination of the status of advertised SMS packages from a user at the client device (block 400). The request may be received by an interface application executing on the client device separately from an SMS client application executing on the client device. In some embodiments, the operations as will now be described as reference to blocks 410-440 are carried out at the client device responsive to the received request from block 400 without further input from the user. In other words, in some embodiments as illustrated in FIG. 4, a simplified user interface may be provided by obtaining and generating an informational display to a user without requiring any intervening steps or decisions by a user after the initial request for a determination of status from the user. As such, easily understandable information may be provided to a user without requiring extensive training or the like and with minimum risk of erroneous input from a user affecting the resulting information display.

Responsive to the received request of block 400, a plurality of SMS packages that have been advertised to the client device are identified (block 410). The identified plurality of SMS packages may be security patches and/or software distributions advertised by an SMS server communicatively coupled to the client device in some embodiments. The installation status of the identified plurality of SMS packages is determined (block 420). Operations related to identify advertise packages and determining their installations status at block 410 and 420 may include querying by the interface application 361 of log files generated by the SMS client application 360 running on the client device 110. Furthermore, in some embodiments, operations at block 410 identify a plurality of SMS packages that have advertised to the client device that are automatic and only identifying automatic advertised SMS packages. In other words, advertised SMS packages that were advertised as manual, in other words, that are left to the user to take further steps and exercise an elective option of installing the advertised SMS packages, may not be status checked in some embodiments of the present invention. As such, a user determination of a need to report a problem may be made easier where only advertised SMS packages that had to have been installed on the client device will be listed and, as a result, any indicated errors will necessarily require action. Where optional (manual) advertised packages are listed, further user assessment may be required before determining if an indication of failure or a lack of installation shows up on a report where ones of the listed packages in the report may be optional.

A graphical user interface (GUI) is generated that list the identified plurality of SMS packages and provides a visual indication of the determined installation status of the listed plurality of SMS packages (block 430). The generated GUI is displayed to the user on a display of the client device (block 440).

Operations related to generating a graphical user interface (GUI) at block 430 for display at block 440 will now be described for particular embodiments of the present invention with reference to the flow chart illustration of FIG. 5. It will be understood that one or more of the exemplary operations at blocks 500-530 may be included or left out in different embodiments of the present invention. Referring now to FIG. 5, operations begin with designating ones of the listed plurality of SMS packages as successfully installed, not installed, or failed installation (block 500). Different color displays and/or different associated icons are provided for respective ones of the listed SMS packages based on their associated designation (block 510).

In some embodiments, operations at block 510 include associating a green display and/or a smiley face icon with a successfully installed SMS package, associating a yellow display and/or geometric icon with a not installed SMS package and associating a red display and/or a sad face icon with a failed installation SMS package. Providing different color displays may include providing different colored backgrounds for rows of the GUI associated with the respective ones of the listed plurality of SMS packages. For example, providing different colored backgrounds may include providing a green background for successfully installed SMS packages, a yellow background for not installed SMS packages and a red background for failed installation SMS packages. An example of such a display, including different colored backgrounds on respective rows and icons as described above, is illustrated in FIG. 9.

Figure 9:
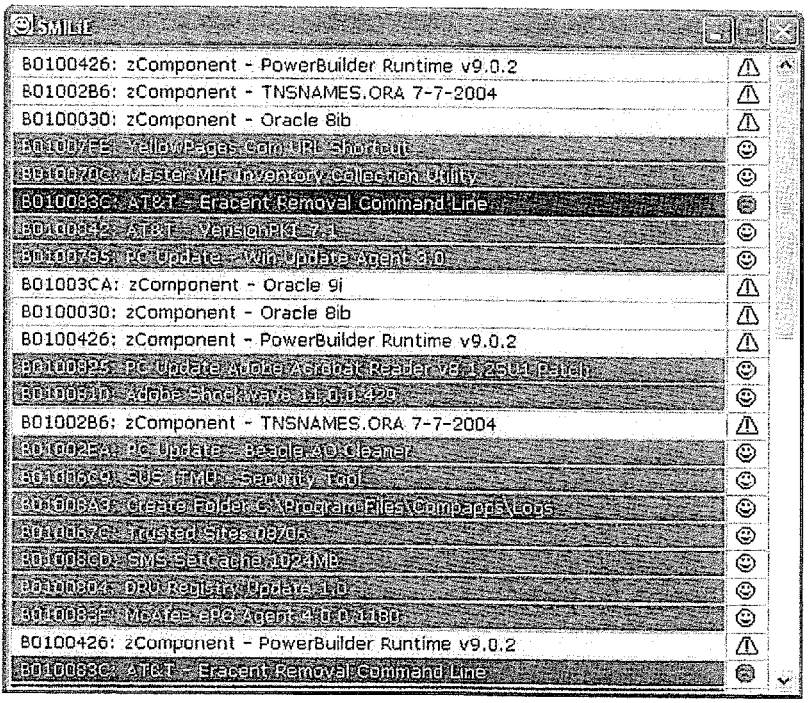
FIG. 9 is a schematic illustration of a GUI including visual indications of installation status according to further embodiments of the present invention.

As described above and seen in FIG. 9, a single application may read all SMS packages that are advertised to a client device and check the installation status thereof and display this information in a user friendly window using smiley faces, informational triangles and sad faces. As shown in FIG. 9, successful installation includes a row with a green background on the package name and a smiley face in an icon column on the associated row. Advertised packages that have not yet been installed are shown with the yellow background on the package name row and an informational triangle for failed installation packages a red background is provided for the row including the package name with a red sad face. In some embodiments, if an item is displayed as yellow, the visual indication conveys that the client device knows the package has been advertised and downloaded, however, the package has not yet been run (where installation occurs at the time of first run). Such a result may occur for various reasons and, rather than report an error immediately, a user may attempt to run/install this package at a different time. However, if a problem persists, a yellow status may be processed by a user as an error to be reported like a red status. A red display may differ in that it may indicate that the package has been downloaded and attempted to be installed and received a failure code during or following the installation process and further intervention may be required to address the problem and assure successful installation of the package.

Figure 8A:
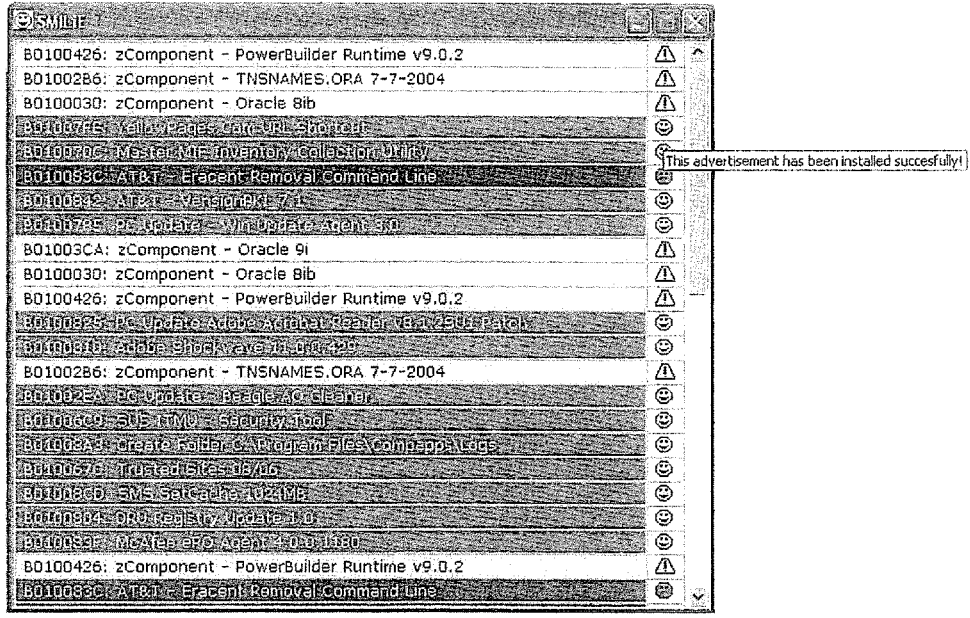
FIGS. 8A to 8C are schematic illustrations of GUIs including visual indications of installation status according to some embodiments of the present invention.
Figure 8B:
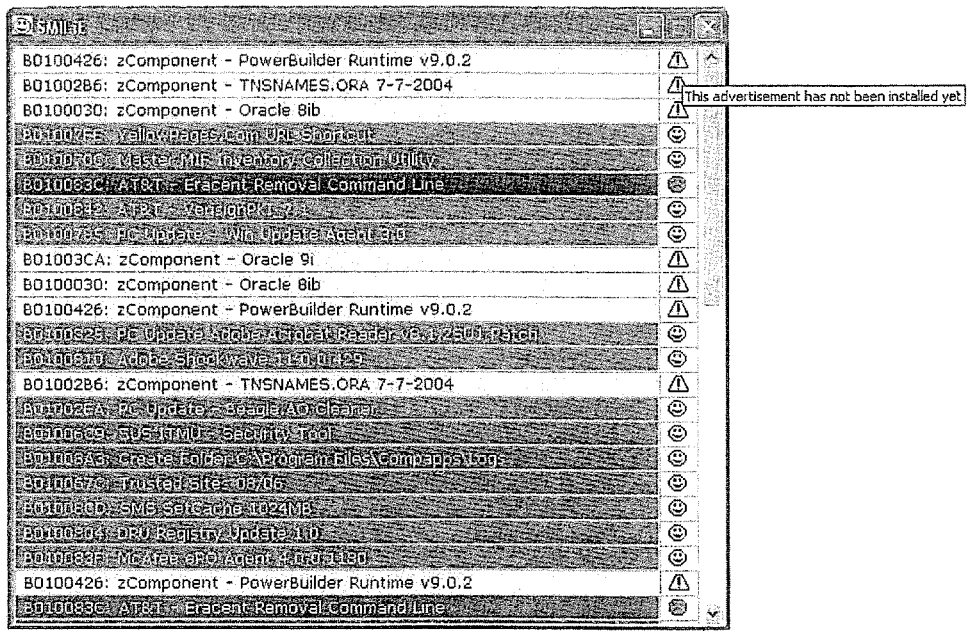
Figure 8C:
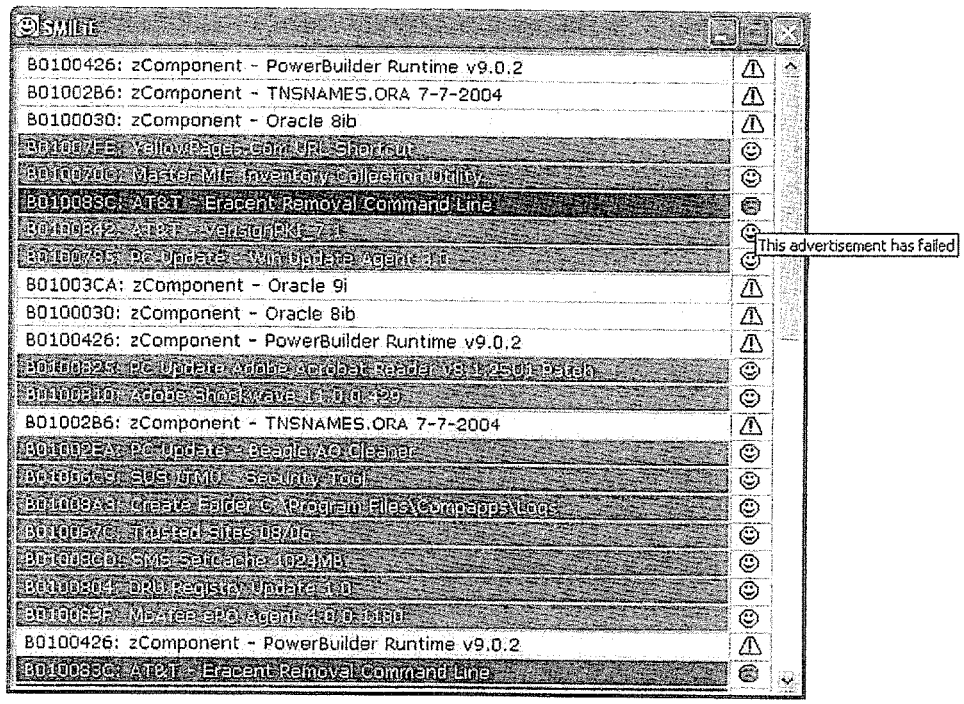

Referring again to FIG. 5, in some embodiments, after display of the GUI, placement of a curser of the client device over a selected one of the listed plurality of SMS packages is detected (block 520). A help box containing information associated with the selected one of the listed pluralities of SMS packages is displayed to a user on the display of the client device (block 530). The information contained in the help box may include a textual description of the determined installation status of the selected one of the listed plurality of SMS packages as illustrated, for example, in FIGS. 8A-8C. FIGS. 8A-8C show, respectively, the help box display with textual description information for a successful, not installed and failed install SMS package.

Further embodiments of methods for determining status of advertised SMS packages at a client device will now be described with reference to the flow chart illustration of FIG. 6. As shown in the embodiments of FIG. 6, operations begin with receiving a request for determination of the status from a user at an interface application 361 executing on the client device separately from an SMS client application 360 executing on the client device (block 600).

Operations performed by the interface applications responsive to the received request will now be described with reference to block 610 and 620 of FIG. 6. A plurality of SMS packages that have been advertised to the client device are identified and an installation status of the identified plurality of SMS package is determined by querying log files generated by the SMS client application (block 610). A graphical user interface (GUI) that lists the identified plurality of the SMS packages and provides a visual indication-of the-determined installation status of the listed plurality of SMS packages is generated (block 620). Note that operations at block 620, in some embodiments, may proceed as described previously with reference to FIG. 5.

Figure 7:
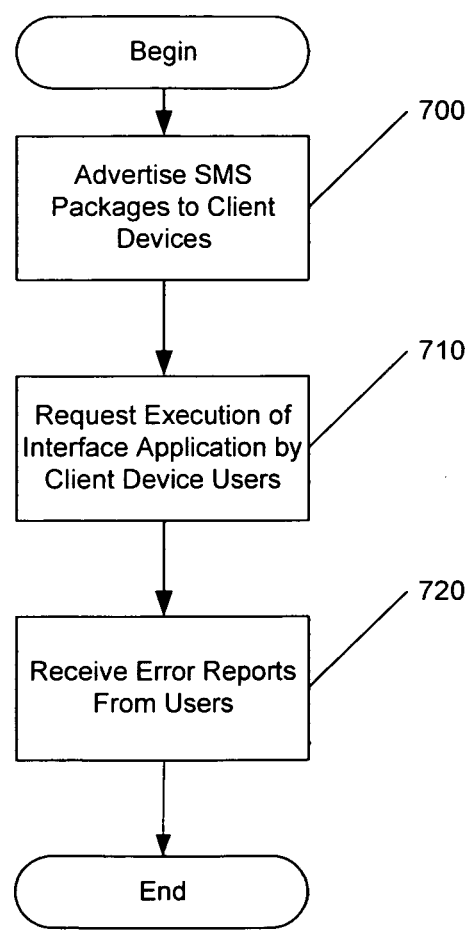
FIG. 7 is a flowchart illustrating operations for monitoring status of distribution of advertised SMS packages to client devices according to some embodiments of the present invention.

Methods for monitoring status of distribution of advertised system management server (SMS) packages to a plurality of client devices according to some embodiments of the present invention will now be described with reference to the flow chart illustration of FIG. 7. Operations begin by advertising the SMS packages to the client devices (block 700). The SMS packages may be advertised to the client devices as automatic or manual by, for example, an SMS server application executing on the SMS server device 105 (FIG. 2).

Figure 6:
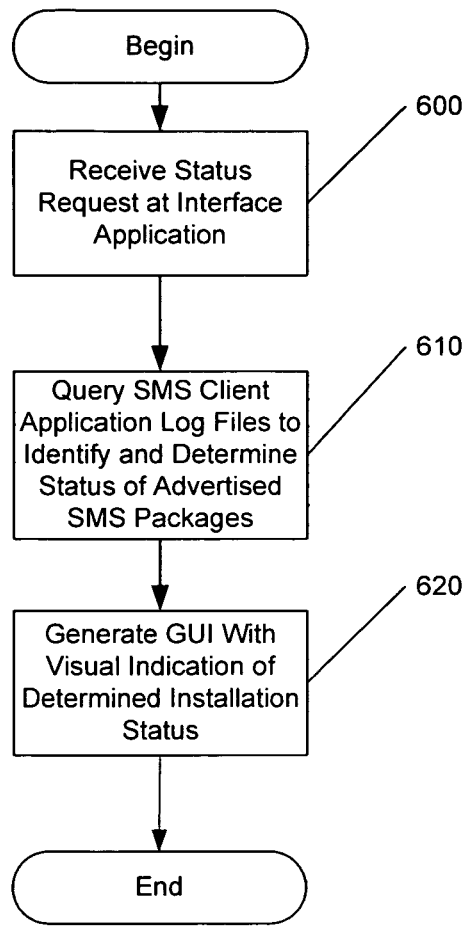

The SMS server application may further request that the client devices determine status of adverse system management server (SMS) packages at the respective client devices, for example, according to operations as described previously for the embodiments of the present invention illustrated in FIGS. 4-6 (block 710). In other words, the requests to the users may request execution by the client devices of an interface application on the respective client devices separately from SMS client applications executing on the client devices. The interface applications may be configured to identify the SMS packages that have been advertised to the client devices, determine installation-status of the identified SMS packages by querying log files generated by the SMS client applications and generate graphical user interfaces (GUI's) that list the respective identified SMS packages and provide a visual indication of the determined installation status of the listed SMS packages (block 710). Error reports are received from the users identifying problems indicated in the respective GUI's (block 720). Note that, in some of the embodiments, only SMS packages advertised as automatic are identified and listed in GUI's.

In some of the embodiments of the present invention, the interface application may be pushed to a user's client device by the SMS server application. For purpose of the example below, the interface application is referred to as "SMILiE.exe". The push of the interface application may be provided as described in the example below:

The installation package creates a subfolder called "SMILie" in the % ProgramFiles % folder (the % ProgramFiles % variable represents the location of the program files folder whether it is on the C:\, D:\, or E:\, etc . . . ).

The SMILiE.exe is placed in the % ProgramFiles %\SMILiE\ folder

The SMILiE.ico is placed in the % ProgramFiles %\SMILiE\ folder

The SMILiE.lnk shortcut is placed in the % ALLUSERSPROFILE %\Desktop (where the % ALLUSERSPROFILE % variable is the location of the All The single file executable (SMILiE.exe) may perform various functions once executed, including copying graphics used for the generated user display to the user's temp directory and copying the SMILiE.vbs file to the user's temp directory. The graphics may, for example, include a happyface.bmp, sadface.bmp, info.bmp and/or bls.ico. These files may not be deleted so that, when a user desires to execute the hta file, all graphics are available. These files may be overwritten the next time the interface application SMILiE.exe is executed. The SMILiE.vbs file may be hidden by use of the hidden attribute for the user's temp directory. The vbs file, once executed, may create a SMILiE.hta file and the hta file may then be displayed to the user. When trouble shooting a distributed SMS package or the interface application (SMILiE.exe), a technican may access the most recent SMILiE.hta file in the user's temp directory. Distribution of the SMILiE installation file may be provided utilizing a SMILiE.zip file that contains the following files:

| | |
|---|---|
| SMILiE.exe = | Application executable |
| SMILiE.ico = | Icon |
| SMILiE.lnk = | Shortcut |
| SMILiE.info = | Documentation in a text format |

As will be appreciated by one of skill in the art, the present invention may be embodied as a method, system, or computer program product. Accordingly, the present invention may take the form of an entirely hardware embodiment, a software embodiment or an embodiment combining software and hardware aspects all generally referred to herein as a "circuit" or "module." Furthermore, the present invention may take the form of a computer program product on a computer-usable storage medium having computer-usable program code embodied in the medium. Any suitable computer readable medium may be utilized including hard disks, CD-ROMs, optical storage devices, or magnetic storage devices.

Computer program code for carrying out operations of the present invention may be written in an object oriented programming language such as Java®, Smalltalk or C++. However, the computer program code for carrying out operations of the present invention may also be written in conventional procedural programming languages, such as the "C" programming language and/or a lower level assembler language. The program code may execute entirely on the user's computer (i.e., controller of the user's mobile terminal), partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Furthermore, the present invention was described in part above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and schematic diagrams of FIGS. 2 through 7 illustrate the architecture, functionality, and operations of some embodiments of methods, systems, and computer program products for determining status of advertised SMS packages at a client device or monitoring status of advertised SMS packages at client devices. In this regard, each block may represent a module, segment, or portion of code, which comprises one or more executable instructions for implementing the specified logical function(s). It should also be noted that in other implementations, the function(s) noted in the blocks may occur out of the order noted in the figures. For example, two blocks shown in succession may, in fact, be executed substantially concurrently or the blocks may sometimes be executed in the reverse order, depending on the functionality involved.

In the drawings and specification, there have been disclosed exemplary embodiments of the invention. Although specific terms are employed, they are used in a generic and descriptive sense only and not for purposes of limitation, the scope of the invention being defined by the following claims.

That which is claimed is:

1. A method for determining a status of advertised system management server packages at a client device, comprising: receiving a request for a determination of the status from a user at the client device at an interface application executing on the client device separately from a system management server client application executing on the client device; and
performing operations as follows responsive to the request without further input from the user:
identifying a plurality of system management server packages that have been advertised to the client device and determining an installation status of the plurality of system management server packages by querying log files generated by the system management server client application using the interface application, wherein querying log files includes using a query to extract data from contents of the log files reflecting the installation status of respective ones of the plurality of system management server packages and wherein the query is generated without user input;
generating a graphical user interface that lists the plurality of system management server packages and provides a visual indication of the installation status of the plurality of system management server packages; and
displaying the graphical user interface to the user on a display of the client device.

2. The method of claim 1, wherein identifying the plurality of system management server packages comprises identifying a plurality of system management server packages that have been advertised to the client device that are automatic and wherein the plurality of system management server packages are all automatic advertised system management server packages.

3. The method of claim 1, wherein generating the graphical user interface that lists the plurality of system management server packages and provides the visual indication of the installation status of the plurality of system management server packages includes:
designating ones of the plurality of system management server packages as successfully installed; and
providing different colored displays for the respective ones of the system management server packages.

4. The method of claim 3, wherein a green display or smiley face icon is associated with a successfully installed system management server package, a yellow display is associated with a not installed system management server package and a red display is associated with a failed installation system management server package.

5. The method of claim 3, wherein providing different colored displays comprises providing different colored backgrounds for rows of the graphical user interface associated with the respective ones of the plurality of system management server packages.

6. The method of claim 3, wherein providing different colored displays comprises providing a green background for a successfully installed system management server package, a yellow background for a not installed system management server package and a red background for a failed installation system management server package.

7. The method of claim 1, wherein displaying the graphical user interface is followed by:
displaying a help box containing information associated with a selected one of the plurality of system management server packages on the display in response to detecting placement of a cursor of the client device over the selected one of the plurality of system management server packages.

8. The method of claim 7, wherein the information contained in the help box comprises a textual description of the installation status of the selected one of the plurality of system management server packages.

9. The method of claim 1, wherein the plurality of system management server packages comprises security patches advertised by a system management server communicatively coupled to the client device.

10. The method according to claim 1, wherein the interface application is pushed to the client device by a system management server application;
   wherein the interface application, upon execution, copies graphics used in providing the visual indication of the installation status of the system management server packages in the generated graphical user interface to the client device; and
   wherein the graphics remain on the client device after execution of the interface application has been concluded.

11. A method for determining a status of advertised system management server packages at a client device, comprising:
   receiving a request for a determination of the status from a user at an interface application executing on the client device separately from a system management server client application executing on the client device; and
   performing operations as follows carried out by the interface application responsive to the request:
   identifying a plurality of system management server packages that have been advertised to the client device and determining an installation status of the plurality of system management server packages by querying log files generated by the system management server client application, wherein querying log files includes using a query to extract data from contents of the log files reflecting the installation status of respective ones of the identified plurality of system management server packages and wherein the query is generated without user input; and
   generating a graphical user interface that lists the plurality of system management server packages and provides a visual indication of the installation status of the plurality of system management server packages.

12. The method of claim 11, wherein generating the graphical user interface that lists the plurality of system management server packages and provides the visual indication of the installation status of the plurality of system management server packages includes:
   designating ones of the plurality of system management server packages as successfully installed; and
   providing different colored displays for the respective ones of the system management server packages.

13. A method for monitoring a status of distribution of system management server packages to a plurality of client devices, comprising:
   advertising the system management server packages to the plurality of client devices;
   requesting that users of the client devices execute an interface application on the respective client devices, separately from system management server client applications executing on the client devices, to identify the system management server packages, determine an installation status of the system management server packages by querying log files generated by the system management server client applications and generate graphical user interfaces that list the respective system management server packages and provide a visual indication of the installation status of the system management server packages; and
   receiving error reports from the users identifying problems indicated in the graphical user interfaces;
   wherein querying log files includes using a query to extract data from contents of the log files reflecting the installation status of respective ones of the system management server packages and wherein the query is generated without user input.

14. The method of claim 13, wherein advertising the system management server packages comprises advertising the system management server packages to the client devices as automatic and wherein the system management server packages are all automatic advertised system management server packages.

* * * * *